Oct. 26, 1965  E. H. WALSH  3,213,489
SKINNING APPARATUS
Filed Feb. 28, 1963  2 Sheets-Sheet 1
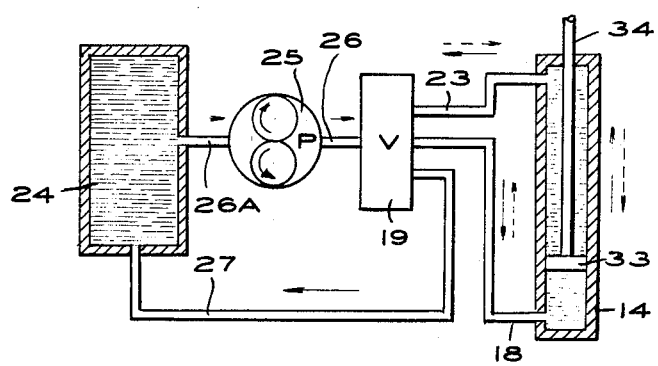
FIG. 6
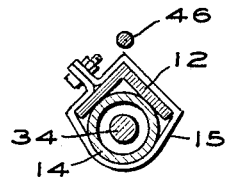
FIG. 5
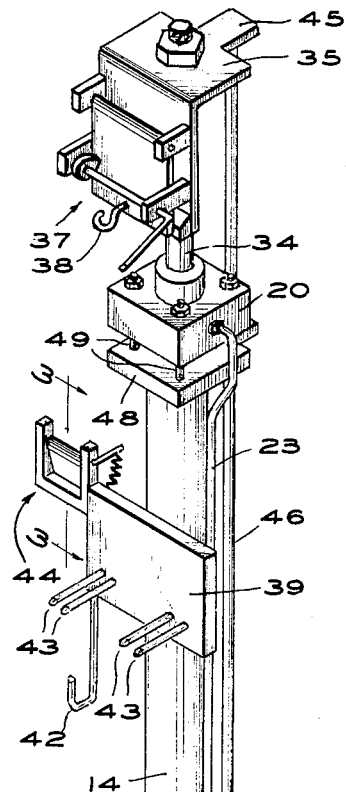
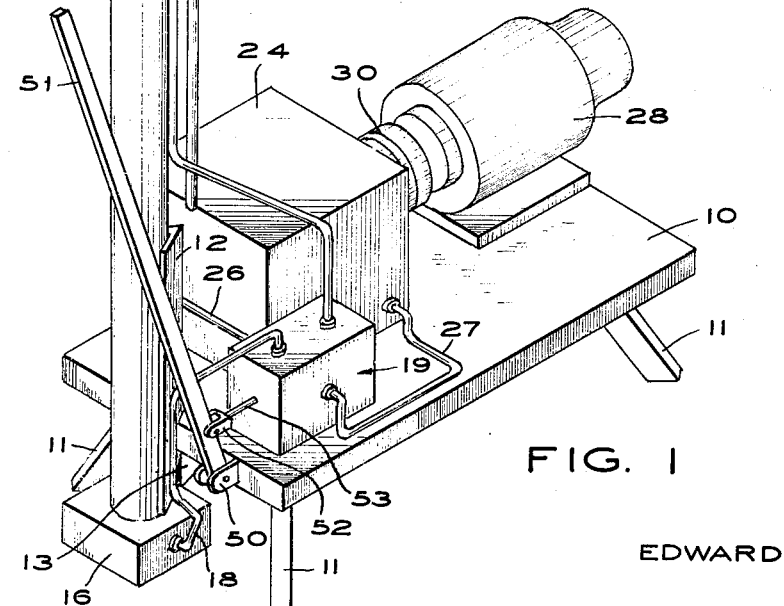
FIG. 1
INVENTOR
EDWARD H. WALSH
BY
ATTORNEY Oct. 26, 1965     E. H. WALSH     3,213,489
SKINNING APPARATUS
Filed Feb. 28, 1963     2 Sheets-Sheet 2
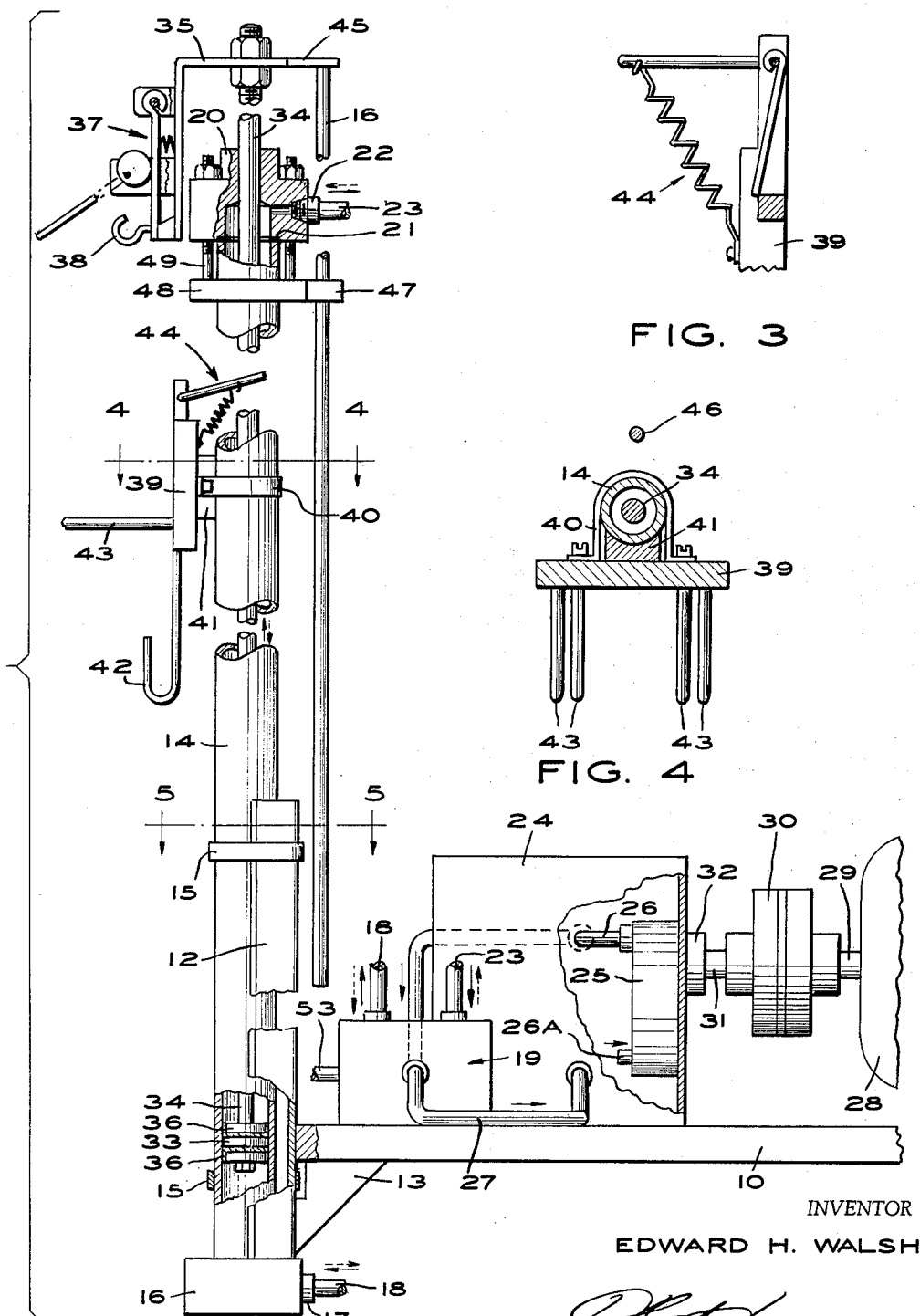
INVENTOR
EDWARD H. WALSH
BY 
ATTORNEY

United States Patent Office 3,213,489
Patented Oct. 26, 1965

3,213,489
SKINNING APPARATUS
Edward H. Walsh, R.R. 2, Beamsville, Ontario, Canada
Filed Feb. 28, 1963, Ser. No. 261,674
6 Claims. (Cl. 17—21)

The present invention relates to a machine for removing hides of fur bearing animals and it consists in the combinations, constructions and arrangements of parts hereindescribed and claimed.

Generally there is provided an apparatus for the skinning of hides from fur bearing animals such as mink or the like and which consists of a platform to the forward end of which is affixed a vertically extending cylinder. A piston is mounted within the cylinder and a piston rod extends upwardly through the upper end of the cylinder. Clamp members are affixed to the upper end of the piston rod and to the cylinder. The piston is adapted to be moved upwardly and downwardly at the will of the operator by means of hydraulic fluid applied selectively at the upper and lower ends of the cylinder. A reservoir is mounted upon the platform and a pump is mounted within the reservoir and is connected in suitable manner with a motor likewise mounted on the platform. A three-way valve operable by lever placed conveniently to the operator is likewise mounted upon the platform and is adapted to control the movements of the piston and accordingly the movement of the clamp members toward and away from one another. Suitable hooks and other holding members are attached to the aforesaid clamping members and the apparatus is such that by a proper manipulation hides may be stripped from fur bearing animals in a minimum of time and with a minimum of effort.

It is accordingly an object of the invention to provide an apparatus of the character set forth which is simple in construction, inexpensive to manufacture and yet effective and efficient in use.

Another object of the invention is to provide, in a device of the character set forth, novel power means for the separation of hides from the carcasses of animals.

Still another object of the invention is to provide, in a device of the character set forth, novel power means for moving clamping members toward and away from each other.

A still further object of the invention is to provide pairs of novel pad holding forks forming part of the invention.

Other and further objects of the invention will become apparent from a reading of the following specification taken in conjunction with the drawings, in which:

FIGURE 1 is a perspective view of an embodiment of the invention,

FIGURE 2 is a fragmentary side elevational view, partly broken away, of the device illustrated in FIGURE 1, FIGURE 3 is an enlarged fragmentary sectional view illustrating a portion of the apparatus shown in FIGURE 2, FIGURE 4 is an enlarged sectional view taken substantially along line 4—4 of FIGURE 2, FIGURE 5 is a sectional view taken along line 5—5 of FIGURE 2, and FIGURE 6 is a schematic view illustrating the operation of the mechanism, the full line arrows indicating the direction of normal flow and the dotted arrows indicating the reverse flow where the same is applicable.

Referring more particularly to the drawings, there is shown therein a machine for the removal of hides from fur bearing animals comprising a platform 10 supported by legs 11. To the forward end of the platform 10 there is affixed a vertically extending angle iron 12 which is reinforced by a gusset plate 13.

A vertically extending cylinder 14 is clamped by means of rings 15 to the member 12 and extends upwardly therefrom. The lower end of the cylinder 14 is closed by a block 16 provided with a fitting 17 from which extends a pipe 18 the other end of which is connected to a valve 19.

The upper end of the cylinder 14 is closed by a block 20 and a sealing gasket 21 is interposed between the block and the upper end of the cylinder 14. A fitting 22 is mounted in the block 20 and a pipe 23 interconnects the same with valve 19.

A reservoir 24 is mounted upon the platform 10 and has mounted therein a pump 25 having an outlet pipe 26 extending therefrom and through the walls of the reservoir to connect with the valve 19. The pump is also provided with an inlet pipe 26a which terminates inside the reservoir 24. A pipe 27 interconnects the valve 19 with the interior of the reservoir 24.

A motor 28 is mounted atop the platform 10 and is shown as an electric motor but it is to be understood that other types of motors such as gasoline powered motors might be used. The motor 28 is provided with a shaft 29 which is connected by a flexible coupling 30 to a drive shaft 31 of the pump 25 which shaft 31 extends through an oil seal 32 in the rear wall of the reservoir 24.

A piston 33 is mounted in the cylinder 14 and provided with an upwardly extending piston rod 34 to the upper end of which is affixed an inverted L-shaped bracket 35. The piston is provided with upper and lower leather cups 36 which are suitably secured thereon.

To the downwardly extending portion of the bracket 35 there is secured a clamping member generally designated at 37 and which is provided with a hook 38. In vertical alignment with the clamp 37 there is mounted a plate 39 which is affixed to the cylinder 14 by means of a clamp ring 40 and spaced from the cylinder 14 by a spacer member 41. A hook 42 is dependently mounted on the plate 39 and two pairs of forks 43 extend forwardly from the plate 39. A clamp member generally designated as 44 is affixed to one side of the plate 39.

To a rearward extension 45 of the bracket 35 there is affixed a downwardly extending guide rod 46 which extends through a rearward extension 47 of a bracket 48 which surrounds the cylinder 14 and is dependently affixed to the block 20 by means of a plurality of bolts 49.

Pivotally connected to a pair of ears 50 affixed to the forward end of the platform 10 is an operating handle 51. A fork 52 is pivotally connected to the handle 51 and has a valve operating rod 53 extending rearwardly therefrom into the valve 19 to operate the latter.

In operation, in order to skin an animal, one of the hind paws is placed in the clamp 44 while the other hind paw is held in one hand of the operator to sever the hide from the carcass from paw to paw after which the first paw is released from the clamp 44. Both hind pads of the carcass are then cut off with conventional cutters after which both hocks are clamped by the upper clamp 37 whereupon the hide is pulled down until the tail bone is bared after which the pelt is cut at the anus. The tail bone is then positioned in the hook 38 and a conventional tail puller is utilized to pull the tail hide from the bone thereof. Thereafter both of the hind pads, which are still attached to the hide are then positioned one within each pair of forks 43 and the handle 51 is then used to manipulate the valve 19 to raise the clamp 37 with respect to the forks 43 thereby stripping the pelt from the carcass.

It will be apparent that the valve 19 is of conventional three-way type and that manipulation thereof by means of the handle 51 will cause, when the handle 51 is in neutral position, a flow of fluid from the pump through the valve, thence through the pipe 27 back to the reservoir and again, through the pipe 26a, to the pump 25. When the valve is in another position, it will cause fluid to flow from the pump 25 through the pipe 26 to the valve 19, thence through the pipe 23 to the upper end of the cylinder 14 to move the piston 33 and consequently the piston rod 34 in a downward direction, the fluid beneath the piston 33 moving through the pipe 18 back through the valve 19 and thence through the pipe 27 to the reservoir 24. Again, in a third position of the valve 19, fluid is directed to the lower end of the cylinder 14 to move the piston 33 and its attached piston rod 34 in an upward direction to thus cause the clamp member 37 to move upwardly away from the plate 39 and its attached mechanisms.

While but one form of the invention has been shown and described herein, it will be readily apparent to those skilled in the art that many minor modifications may be made without departing from the spirit of the invention or the scope of the appended claims.

What is claimed is:

1. A machine for removing hides from fur bearing animals comprising a support platform, an hydraulic cylinder vertically mounted on said platform, a piston in said cylinder, a piston rod extending from the upper end of said cylinder, clamping plate means carried by the upper end portion of said rod, a clamping member swingably mounted on said plate means for swinging about a horizontal axis towards and away from said plate means, locking means operable to engage said clamping member and urge the same towards said plate means, clamping means mounted on said cylinder, and means for displacing said piston with respect to said cylinder.

2. A machine for removing hides from fur bearing animals comprising a support platform, an hydraulic cylinder vertically mounted on said platform, a piston in said cylinder, a piston rod extending from the upper end of said cylinder, clamping means carried by the upper end portion of said rod, clamping plate means mounted on said cylinder, two adjacent pairs of rod members fastened to said plate means and extending outwardly therefrom along substantially parallel axes, said rod members being rounded in section for gripping the foot portions of said animal hide without tearing, means for displacing said piston with respect to said cylinder, and hok means associated with each of said clamping means.

3. A machine for removing hides from fur bearing animals comprising a support platform, an hydraulic cylinder vertically mounted on said platform, a piston in said cylinder, a piston rod extending from the upper end of said cylinder, clamping means carried by the upper end portion of said rod, clamping means mounted on said cylinder, means for displacing said piston with respect to said cylinder, guide plate means affixed to said cylinder adjacent the clamping means carried thereby, a bracket mounted atop said piston rod, and a vertical guide rod affixed to said bracket in parallel relation to said piston rod and extending downwardly and slidably through said guide plate.

4. A machine for removing hides from fur bearing animals comprising a support platform, an hydraulic cylinder vertically mounted on said platform, a piston in said cylinder, a piston rod extending from the upper end of said cylinder, clamping means carried by the upper end portion of said rod, clamping means mounted on said cylinder, means for displacing said piston with respect to said cylinder, a guide plate affixed to said cylinder adjacent the clamping means carried thereby, a bracket mounted atop said piston rod, a vertical guide rod affixed to said bracket in parallel relation with said piston rod and extending downwardly and slidably through said guide plate, and hook means associated with each of said clamping means.

5. A machine for removing hides from fur bearing animals on a support platform, an hydraulic cylinder vertically mounted on said platform, said cylinder having a piston and piston rod connected thereto and means communicating with a source of hydraulic pressure, clamping plate means, carried by said rod, a clamping jaw member swingably mounted on said plate means, locking means operable to clamp said jaw member against said plate means, and clamping means mounted in fixed relation to said cylinder.

6. A machine as claimed in claim 5 including an abutment fastened to said plate means in registration with said jaw member and a cam member forming part of said locking means and providing camming engagement of said jaw member.

References Cited by the Examiner

UNITED STATES PATENTS 2,496,394   2/50   Hincks _____ 17—21
3,024,491   3/62   Mills _____ 17—21

FOREIGN PATENTS 135,358   1/61   Russia.

SAMUEL KOREN, *Primary Examiner.*

LUCIE H. LAUDENSLAGER, *Examiner.*